US012700217B2

(12) United States Patent
Wee et al.

(10) Patent No.: US 12,700,217 B2
(45) Date of Patent: Aug. 4, 2026

(54) SYSTEM AND METHOD FOR PROCESSING TRAINING DATASET ASSOCIATED WITH SYNTHETIC IMAGE

(71) Applicants: Hyundai Motor Company, Seoul (KR); Kia Corporation, Seoul (KR)

(72) Inventors: Minkooc Wee, Osan-si (KR); Sung Hoon Bang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 755 days.

(21) Appl. No.: 17/987,452

(22) Filed: Nov. 15, 2022

(65) Prior Publication Data

US 2023/0334831 A1     Oct. 19, 2023

(30) Foreign Application Priority Data

Apr. 15, 2022   (KR) ......................... 10-2022-0046906

(51) Int. Cl.
*G06V 10/774*     (2022.01)
*G06T 17/00*      (2006.01)

(52) U.S. Cl.
CPC ............ *G06V 10/774* (2022.01); *G06T 17/00* (2013.01); *G06T 2210/32* (2013.01); *G06V 2201/12* (2022.01)

(58) Field of Classification Search
CPC .. G06V 10/774; G06V 2201/12; G06V 20/64; G06V 10/82; G06V 20/70; G06T 17/00;
G06T 2210/32; G06T 15/20; G06T 5/50; G06T 7/001; G06T 7/13; G06T 7/194; G06T 11/20; G06T 15/205;
(Continued)

(56) References Cited

U.S. PATENT DOCUMENTS 10,311,335 B1 *   6/2019   Kim ...................... G06N 3/084

FOREIGN PATENT DOCUMENTS

KR           102111667 B1     5/2020
KR     10-2022-0023853 A     3/2022

OTHER PUBLICATIONS

"Guanghao Zhai et al., Synthetic data augmentation for pixel-wise steel fatigue crack identification using fully convolutional networks, Jan. 2022, Smart Structures and Systems. vol. 29, Issue 1" (Year: 2022).*
(Continued)

*Primary Examiner* — Chineyere Wills-Burns
*Assistant Examiner* — Phuong Hau Cai
(74) *Attorney, Agent, or Firm* — Banner & Witcoff, Ltd.

(57)     ABSTRACT
Provided is a training dataset generating system including: a communicator to receive a two-dimensional (2D) image obtained by photographing a target object; and a controller configured to generate, based on the 2D image and based on three-dimensional (3D) data for the target object, a training dataset comprising a synthetic image and comprising labeling information, wherein the controller is configured to generate the training data set by: generating, based on the 3D data, a rendered image, generating the synthetic image, based on the 2D image and the rendered image, through deep learning training, extracting, based on at least one of the 3D data or the rendered image, the labeling information for the target object, and generating the training dataset.

24 Claims, 16 Drawing Sheets

(58) Field of Classification Search
CPC  G06T 2207/20081; G06T 2207/20221; G06N
20/00
See application file for complete search history.

(56) References Cited

OTHER PUBLICATIONS

"Zaiwei Zhang et al., Deep Generative Modeling for Scene Synthesis via Hybrid Representations, Apr. 2020, ACM Transactions on Graphics, vol. 39, No. 2, Article 17" (Year: 2020).*

"Jie Wei et al., Learning to Syntheisze 7 T MRI from 3 T MRI with Few Data by Deformable Augmentation, Sep. 2021, Lecture Notes in Computer Science, LNIP, vol. 12966" (Year: 2021).*

"Abdul Waheed et al., CovidGAN: Data Augmentation Using Auciliary Classifier GAN for Improved Covid-19 Detection, May 2020, IEEE Access vol. 8, ISSN 2169-3536" (Year: 2020).*

"Shuyang Gu et al., GIQA: Generated Image Quality Assessment, Nov. 2020, Computer Vision—ECCV 2020, Conference Paper, pp. 369-385" (Year: 2020).*

"Feng Liu et al., Voxel-Based 3D Detection and Reconstruction of Multiple Objects from a Single Image, 2018, Part of Advances in Neural Information Processing Systems 34, NeuIPS 2021" (Year: 2018).*

"Yunpeng Zhang et al., Objects are Different: Flexible Monocular 3D Object Detection, 2021, Proceedings of the IEEE/CVF Conference on Computer Vision and Pattern Recognition, pp. 3289-3298" (Year: 2021).*

"Connor Shorten et al., A Survey on Image Data Augmentation for Deep Learning, Jul. 2019, Journal of Big Data, vol. 6, Article No. 60" (Year: 2019).*

"Li Cu et al., Deep Convolutional Neural Network for Image Deconvolution, 2014, Advances in Neural Information Processing Systems 27, NIPS 2014" (Year: 2014).*

Minkooc Wee, "Real Image Augmentation", Korea Computer Congress (KCC2021), Jun. 25, 2021.

Liu, Dongjie et al:"Data Augmentation Technology Driven By Image Style Transfer in Self-Driving Car Based on End-to-End Learning", Computer Modeling in Engineering & Sciences, vol. 122, No. 2, pp. 593-617(25), Feb. 2020(Feb. 28, 2020).

Bingchen Liu et al:"Sketch-to-Art: Synthesizing Stylized Art Images From Sketches", Proceedings of the Asian Conference on Computer Vision (ACCV), Nov. 30-Dec. 4, 2020(Nov. 30, 2020).

* cited by examiner

FIG. 6

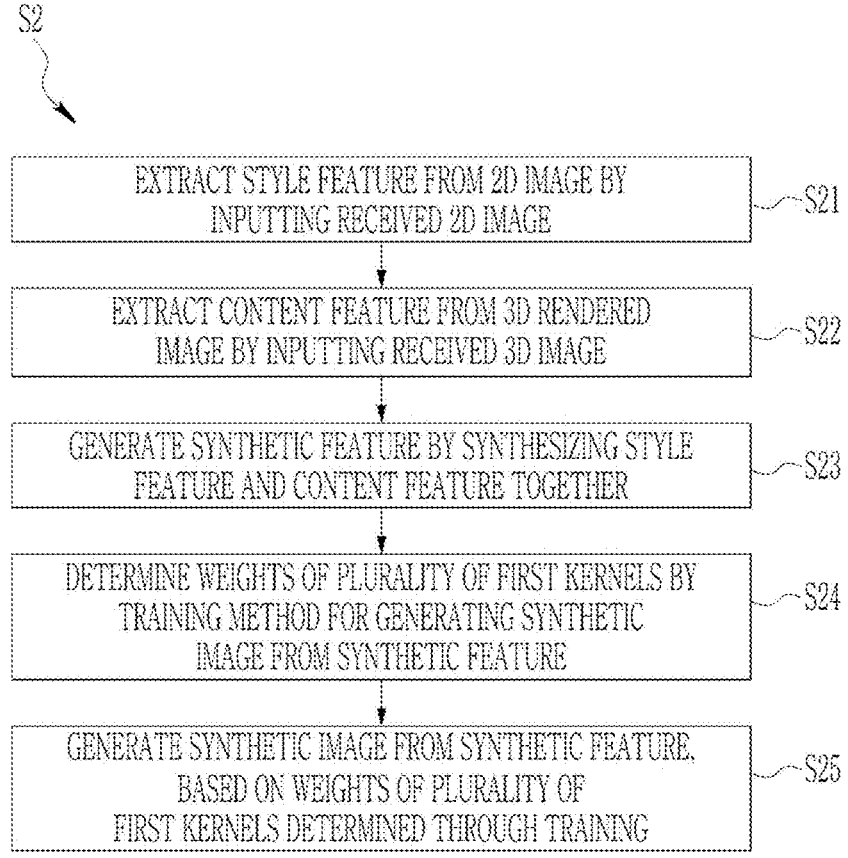

S2

EXTRACT STYLE FEATURE FROM 2D IMAGE BY
INPUTTING RECEIVED 2D IMAGE — S21

EXTRACT CONTENT FEATURE FROM 3D RENDERED
IMAGE BY INPUTTING RECEIVED 3D IMAGE — S22

GENERATE SYNTHETIC FEATURE BY SYNTHESIZING STYLE
FEATURE AND CONTENT FEATURE TOGETHER — S23

DETERMINE WEIGHTS OF PLURALITY OF FIRST KERNELS BY
TRAINING METHOD FOR GENERATING SYNTHETIC
IMAGE FROM SYNTHETIC FEATURE — S24

GENERATE SYNTHETIC IMAGE FROM SYNTHETIC FEATURE,
BASED ON WEIGHTS OF PLURALITY OF
FIRST KERNELS DETERMINED THROUGH TRAINING — S25

FIG. 10

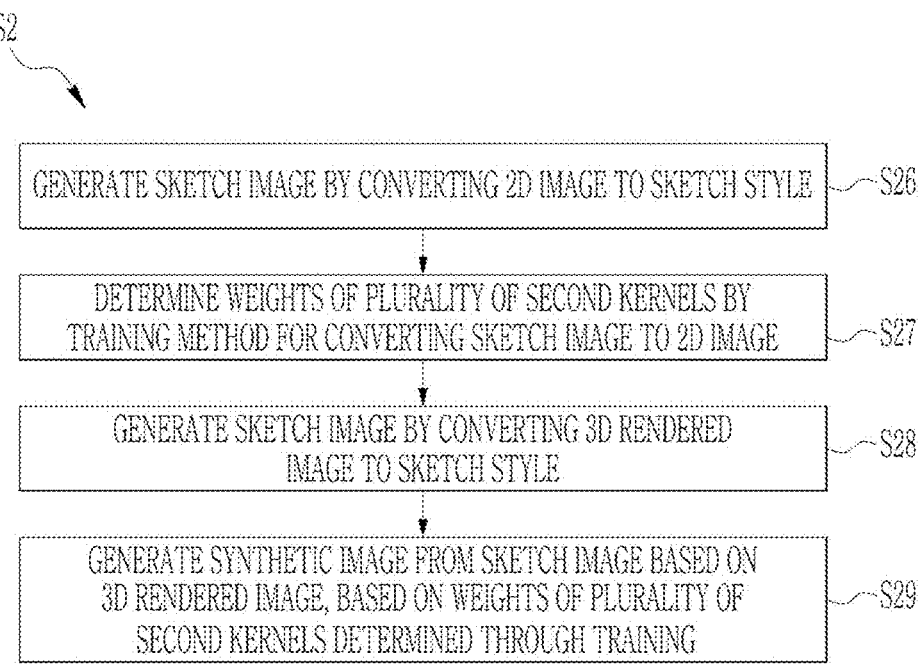

S2

| | |
|---|---|
| GENERATE SKETCH IMAGE BY CONVERTING 2D IMAGE TO SKETCH STYLE | S26 |
| DETERMINE WEIGHTS OF PLURALITY OF SECOND KERNELS BY TRAINING METHOD FOR CONVERTING SKETCH IMAGE TO 2D IMAGE | S27 |
| GENERATE SKETCH IMAGE BY CONVERTING 3D RENDERED IMAGE TO SKETCH STYLE | S28 |
| GENERATE SYNTHETIC IMAGE FROM SKETCH IMAGE BASED ON 3D RENDERED IMAGE, BASED ON WEIGHTS OF PLURALITY OF SECOND KERNELS DETERMINED THROUGH TRAINING | S29 |

FIG. 11

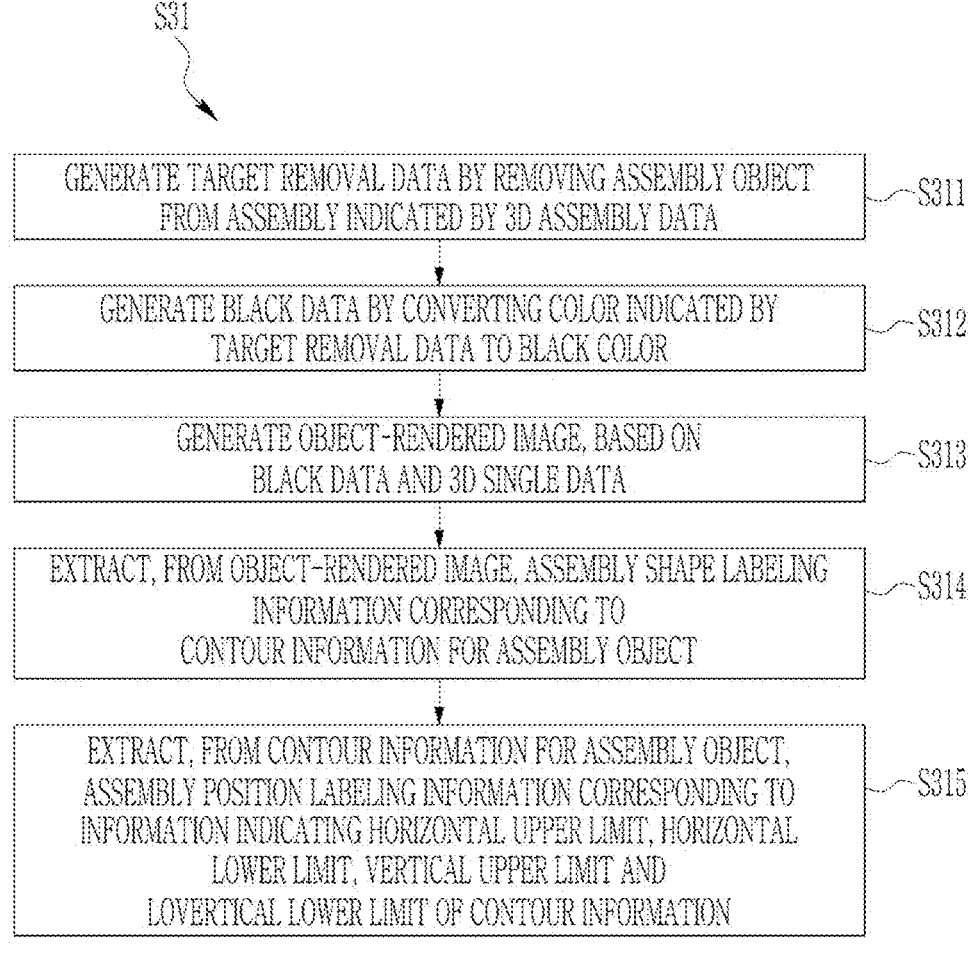

S31

| GENERATE TARGET REMOVAL DATA BY REMOVING ASSEMBLY OBJECT FROM ASSEMBLY INDICATED BY 3D ASSEMBLY DATA | S311 |

| GENERATE BLACK DATA BY CONVERTING COLOR INDICATED BY TARGET REMOVAL DATA TO BLACK COLOR | S312 |

| GENERATE OBJECT-RENDERED IMAGE, BASED ON BLACK DATA AND 3D SINGLE DATA | S313 |

| EXTRACT, FROM OBJECT-RENDERED IMAGE, ASSEMBLY SHAPE LABELING INFORMATION CORRESPONDING TO CONTOUR INFORMATION FOR ASSEMBLY OBJECT | S314 |

| EXTRACT, FROM CONTOUR INFORMATION FOR ASSEMBLY OBJECT, ASSEMBLY POSITION LABELING INFORMATION CORRESPONDING TO INFORMATION INDICATING HORIZONTAL UPPER LIMIT, HORIZONTAL LOWER LIMIT, VERTICAL UPPER LIMIT AND LOVERTICAL LOWER LIMIT OF CONTOUR INFORMATION | S315 |

FIG. 12

S32

| EXTRACT, FROM SINGLE RENDERED IMAGE, SINGLE SHAPE LABELING INFORMATION CORRESPONDING TO CONTOUR INFORMATION FOR SINGLE OBJECT | ~S321 |

| EXTRACT, FROM CONTOUR INFORMATION FOR SINGLE OBJECT, SINGLE POSITION LABELING INFORMATION CORRESPONDING TO INFORMATION INDICATING HORIZONTAL UPPER LIMIT, HORIZONTAL LOWER LIMIT, VERTICAL UPPER LIMIT AND VERTICAL LOWER LIMIT OF CONTOUR INFORMATION | ~S322 |

SYSTEM AND METHOD FOR PROCESSING TRAINING DATASET ASSOCIATED WITH SYNTHETIC IMAGE

CROSS-REFERENCE TO RELATED APPLICATION

This application claims priority to and the benefit of Korean Patent Application No. 10-2022-0046906 filed in the Korean Intellectual Property Office on Apr. 15, 2022, the entire contents of which are incorporated herein by reference.

BACKGROUND

(a) Field

The present disclosure relates to a system and method for generating training dataset.

(b) Discussion of the Background

A data labeling operation may be required to label source data in order to classify a target from a photo, detect a position of the target or find a shape of the target based on its segment, by using an artificial intelligence. Conventionally, the labeling operation has been made in such a manner that an operator manually classifies the target, the position of the target or a contour of the target.

Training data for machine learning may require a large number of photos, and the labeling operation may be required for each of the large number of photos. Therefore, by using the conventional method, it has taken a lot of time to perform the labeling operation, and there has been a deviation in a labeling accuracy depending on the operator.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to provide a system for generating a training image (e.g., by using three-dimensional data for a target object included in a photo) and automatically labeling the target object, and a method for generating the same.

A training dataset generating system may comprise: a communicator to receive a two-dimensional (2D) image obtained by photographing a target object; and a controller configured to generate, based on the 2D image and based on three-dimensional (3D) data for the target object, a training dataset comprising a synthetic image and labeling information. The controller may be configured to generate the training data set by: generating, based on the 3D data, a rendered image; generating the synthetic image, based on the 2D image and the rendered image, through deep learning training; extracting, based on at least one of the 3D data or the rendered image, the labeling information for the target object; and generating the training dataset.

The controller may comprise: an encoder to extract one or more first features from the 2D image and one or more second features from the rendered image; a style transfer module to generate a synthetic feature by synthesizing the one or more first features and the one or more second features; and a decoder to generate the synthetic image, based on the synthetic feature, through the deep learning training.

The decoder may comprise a plurality of deconvolutional layers for deconvolution of the synthetic feature, and determines weights of a plurality of kernels corresponding to the plurality of deconvolutional layers through the deep learning training.

The decoder may generate, based on the weights of the plurality of kernels and based on the synthetic feature, the synthetic image in which a content of the 2D image and a style of the rendered image are synthesized together.

The controller may comprise: a preprocessor to convert the 2D image to a first sketch image; a generator to generate a generator image, based on the first sketch image, through the deep learning training; and a discriminator to determine similarity between the generator image and the 2D image, to determine whether the similarity is greater than or equal to a threshold, and to send, to the generator as a feedback, a determined result associated with the similarity.

The generator may comprise a plurality of convolutional layers to convert the first sketch image to the generator image, and determines, based on the feedback, weights of a plurality of kernels corresponding to the plurality of convolutional layers.

The preprocessor may convert the rendered image to a second sketch image, and the generator may generate, based on the weights of the plurality of kernels and based on the second sketch image, the synthetic image.

The controller may be configured to extract, from the 3D data, classification labeling information for the target object.

The 2D image may comprise a color photo obtained by photographing a region comprising an assembly in which the target object is assembled with another object, the 3D data may comprise assembly data indicating the assembly and single data indicating the target object, and the controller may be configured to extract shape labeling information for the target object and position labeling information for the target object from an object-rendered image generated based on the assembly data and the single data.

The 2D image may comprise a color photo obtained by photographing a region comprising the target object not assembled with another object, and the controller may be configured to extract shape labeling information for the target object and position labeling information for the target object from contour information for the target object shown in the rendered image.

A training dataset generating method may comprise: generating, based on a two-dimensional (2D) image obtained by photographing a target object and based on three-dimensional (3D) data for the target object, a training dataset, wherein the generating comprises: generating, by a controller, a rendered image by rendering the 3D data; generating, by the controller, a synthetic image by synthesizing a content of the 2D image and a style of the rendered image together; extracting, by the controller and from the 3D data or the rendered image, labeling information for the target object; and generating, by the controller and based on the synthetic image and the labeling information for the target object, the training dataset.

The generating of the synthetic image may comprise: extracting, by the controller, a style feature from the 2D image; extracting, by the controller, a content feature from the rendered image; generating, by the controller, a synthetic feature by synthesizing the style feature and the content feature together; and training, by the controller and based on the synthetic feature, a method for generating the synthetic image.

The training of the method for generating the synthetic image may comprise: determining weights of a plurality of kernels corresponding to a plurality of deconvolutional layers for deconvolution of the synthetic feature; and generating, based on the synthetic feature and based on the weights of the plurality of kernels, the synthetic image.

The generating of the synthetic image may comprise generating, based on the synthetic feature and based on weights of a plurality of kernels determined through the training, a synthetic image included in the training dataset.

The generating of the synthetic image may comprise: generating, by the controller, a first sketch image by converting, based on a sketch style, the 2D image; determining, by the controller, weights of a plurality of kernels corresponding to a plurality of deconvolutional layers by training a method for converting the first sketch image to the 2D image through training; generating, by the controller, a second sketch image by converting, based on the sketch style, the rendered image; and generating, by the controller and based on the second sketch image and the weights of the plurality of kernels, the synthetic image.

The determining of the weights of the plurality of kernels may comprise: generating, based on the first sketch image, a generator image; determining similarity between the generator image and the 2D image; determining whether the similarity is greater than or equal to a threshold; and determining, based on a determined result associated with the similarity, weights of the plurality of kernels.

The generating of the synthetic image may comprise generating, based on the second sketch image and based on the weights of the plurality of kernels determined through the training, a synthetic image included in the training dataset.

The extracting of the labeling information for the target object may comprise extracting classification labeling information for the target object from the 3D data.

The 2D image may comprise a color photo obtained by photographing a region comprising an assembly in which the target object is assembled with another object, the 3D data may comprise assembly data indicating the assembly and single data indicating the target object, and the extracting of the labeling information for the target object may comprise: generating, by the controller, target removal data by removing the target object from the assembly; generating, by the controller, black data by converting a color indicated by the target removal data to a black color; generating, by the controller, 3D object data by combining the black data with the single data; and generating, by the controller, an object-rendered image by rendering the 3D object data.

The extracting of the labeling information for the target object may comprise extracting, by the controller and from the object-rendered image, shape labeling information corresponding to contour information for the target object.

The extracting of the labeling information for the target object may comprise extracting, by the controller, position labeling information corresponding to information indicating a horizontal upper limit of the contour information, a horizontal lower limit of the contour information, a vertical upper limit of the contour information, and a vertical lower limit of the contour information.

The 2D image may comprise a color photo obtained by photographing a region comprising the target object not assembled with another object, and the extracting of the labeling information for the target object may comprise extracting, by the controller, shape labeling information corresponding to contour information for the target object from the rendered image.

The extracting of the labeling information for the target object may comprise extracting, by the controller and from the contour information for the target object, the shape labeling information for the target object and position labeling information for the target object.

A non-transitory computer-readable medium storing instructions that cause: generating, based on a two-dimensional (2D) image obtained by photographing a target object and based on three-dimensional (3D) data for the target object, a training dataset, wherein the generating comprises: generating, by a controller, a rendered image by rendering the 3D data; generating, by the controller, a synthetic image by synthesizing a content of the 2D image and a style of the rendered image together; extracting, by the controller and from the 3D data or the rendered image, labeling information for the target object; and generating, by the controller and based on the synthetic image and the labeling information for the target object, the training dataset.

As set forth above, according to the present disclosure, it is possible to generate the synthetic image by using the three-dimensional (3D) data in order to generate the training data used for extracting the target object included in the photo, and extract the labeling information for the target object by using the 3D data and the rendered image, thereby generating the training data extracted from the target object with the high accuracy while reducing the time required for labeling the large number of photos. The speed of labeling may also be increased, and a uniform labeling operation may be achieved.

BRIEF DESCRIPTION OF THE DRAWINGS

FIG. 6 is a detailed flowchart for explaining step S2 of FIG. 2 implemented by the stylization algorithm.

FIG. 10 is a detailed flowchart for explaining step S2 of FIG. 2 implemented by the algorithm of the GAN model.

FIG. 11 is an example flowchart for step S31.

FIG. 12 is an example flowchart for step S32.

DETAILED DESCRIPTION

Figure 1:
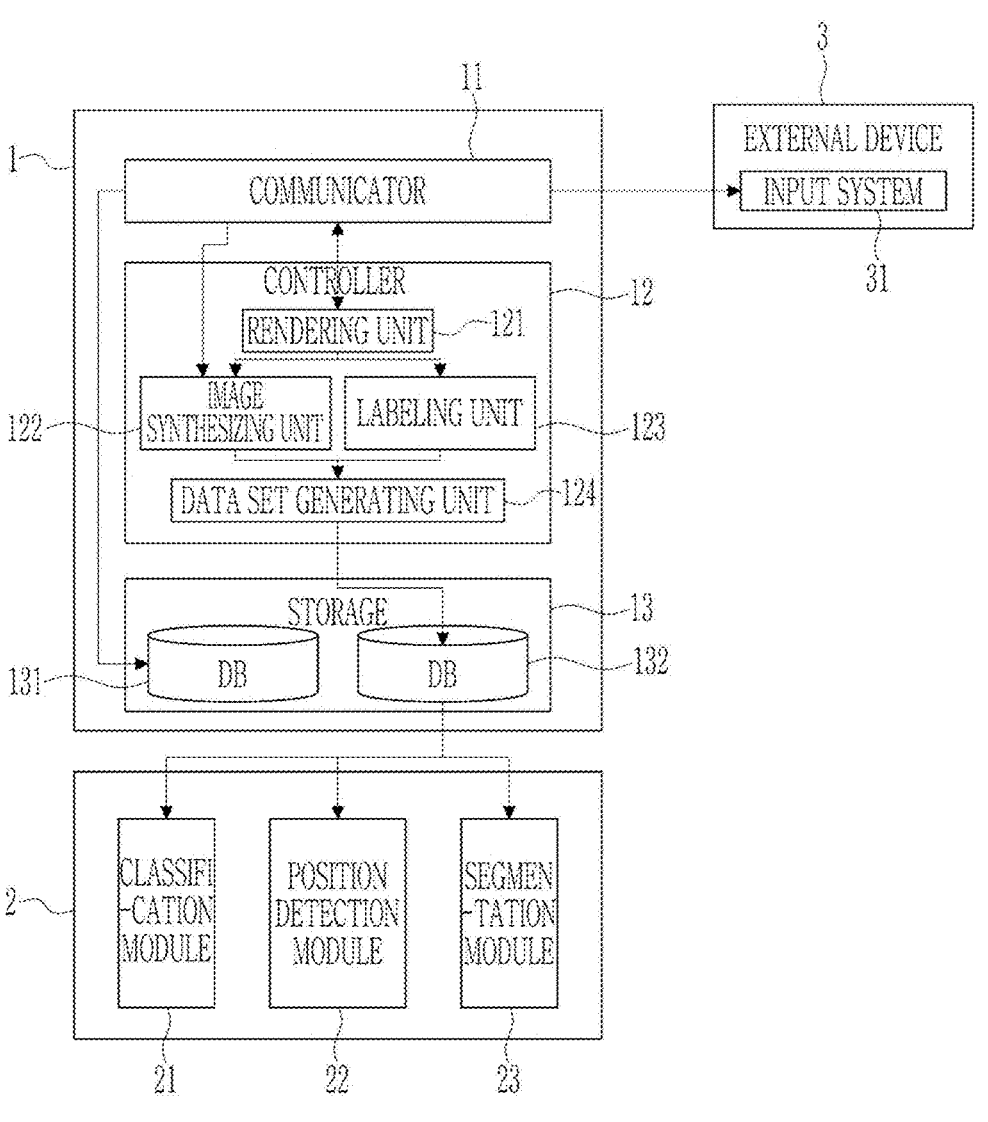
FIG. 1 is a block diagram schematically showing configurations of a training dataset generating system and an object extraction system.

Hereinafter, exemplary embodiment(s) disclosed in the present specification are described in detail with reference to the accompanying drawings, components that are the same as or similar to each other are denoted by the same or similar reference numerals, and an overlapping description thereof is omitted.

Terms "module" and/or "unit" for components described in the following description are used only to make the specification easily understood. Therefore, these terms do not have meanings or roles distinguished from each other in themselves.

Further, when it is decided that a detailed description for the known art related to the present disclosure may obscure the gist of the present disclosure, the detailed description for the known art may be omitted.

Furthermore, it is to be understood that the accompanying drawings are provided only to allow exemplary embodiment(s) of the present disclosure to be easily understood, and the spirit of the present disclosure is not limited by the accompanying drawings and includes all the modifications, equivalents and substitutions included in the spirit and scope of the present disclosure.

Terms including ordinal numbers such as "first", "second" and the like, may be used to describe various components. However, these components are not limited by these terms. The terms may be used only to distinguish one component from another component.

It is to be understood that terms "include", "have" or the like used in the present application specify the presence of features, numerals, steps, operations, elements, parts or a combination thereof, mentioned in the specification, and do not preclude the presence or addition of one or more other features, numerals, steps, operations, elements, parts or combinations thereof.

A program implemented as a set of instructions embodying a control algorithm necessary to control another configuration may be installed in a configuration for controlling another configuration under a specific control condition among configurations according to an exemplary embodiment.

The control configuration may process input data and stored data, based on an installed program to generate output data.

The control configuration may include a non-volatile memory to store the program and a memory storing the data.

FIG. 1 is a block diagram schematically showing configurations of a training dataset generating system and an object extraction system.

A training dataset generating system 1 may generate a training dataset from an image (e.g., a two-dimensional (2D) image) and data (e.g., three-dimensional (3D) data), received from a device (e.g., an external device 3), and transfer the generated training dataset to an object extraction system 2.

The object extraction system 2 may train an object extraction method by using the received training dataset to extract the target object (or object) from the image (e.g., the 2D image).

The target object may be an object to be extracted by the object extraction system 2 among at least one object included in the image (e.g., the 2D image).

For example, the 2D image may be a two-dimensional (2D) color photo (or a black-and-white photo, etc.) obtained by photographing an assembly including the target object, and the 3D data may be three-dimensional (3D) design drawing data including the target object.

In the present disclosure, extracting the object may indicate extracting at least one of the position and shape of the object.

The 3D data may include information on the shape of the object, and information on a connection relationship between the shapes of two or more objects, relative positions of the objects or the like, for example, if there are the two or more objects.

The 3D data may be visually output on an output screen (e.g., through software which may read/receive/identify the 3D data).

Here, the output screen may indicate a visual region in which the 3D data are output.

The 2D image may be a color photo obtained by photographing a region comprising an assembly in which the target object is assembled with another object, or may be a color photo obtained by photographing a region comprising only the target object not assembled with another object.

Hereinafter, an assembly photo may indicate the color photo in which the region including the assembly is photographed in the 2D image, and a single object photo may indicate the color photograph in which only the target object is photographed.

Hereinafter, the 2D image may be at least one of the assembly photo and the single object photo.

The 3D data may be data matching the target object to be extracted from the 2D image.

The 3D data may include data indicating classification of the target object.

For example, the classification of the target object may be the name of a part included in the target object.

Hereinafter, an assembly object may indicate the target object in the assembly assembled with another object, and a single object may indicate a single target object not assembled with another object.

Hereinafter, the target object may be at least one of the assembly object and the single object.

If the 2D image is the assembly photo, the 3D data may include data representing the assembly (hereinafter, 3D assembled data) and 3D data representing only the target object (hereinafter, 3D single data).

If the 2D image is the single object photo, the 3D data may be the 3D single data.

Hereinafter, the 3D data may represent either (1) both the 3D assembled data and the 3D single data or (2) the 3D single data.

The training dataset generating system 1 may receive the 3D data and the 2D image from the external device 3.

The training dataset generating system 1 may generate a 3D rendered image by using the 3D data, generate a synthetic image by synthesizing the received 2D image and 3D rendered image together, extract labeling information for the target object from the 3D data or the 3D rendered image, and generate the training dataset, based on the synthetic image and the labeling information.

The training dataset generating system 1 may store the received 3D data and 2D data, and the generated training dataset.

The labeling information may include at least one of shape labeling information and position labeling information.

The synthetic image may be a synthetic image having contents of the 3D data and a style (e.g., color distribution) similar to that of the 2D image. Hereinafter, the contents of data may indicate the outline of the object(s) comprised in the data. Hereinafter, the style of data may indicate the colors, lightness, saturation, and their distribution included in the data.

The training dataset generating system 1 may include a communicator 11, a controller 12, and a storage 13.

The communicator 11 may receive information necessary for generating training data from the external device 3 by control of the controller 12 through a wired/wireless network. The communicator 11 may include one or more wired communication interfaces (e.g., for communication via Ethernet, the Internet, a local area network (LAN), etc.) and/or one or more wireless communication interfaces (e.g., for communication via cellular network(s), Wi-Fi, Wireless LAN, etc.).

The communicator 11 may receive the 2D image and the 3D data from the external device 3 and transfer the same to the controller 12.

The controller 12 may control the 3D rendered image to be generated by rendering the received 3D data. The controller 12 may include one or more processors and/or one or more hardware components (e.g., semiconductor devices, field programmable gate arrays (FPGAs), etc.) to implement the features of the controller 12 described herein. The controller 12 may include memory storing instructions that, when executed by the one or more processors and/or the one or more hardware components, cause the controller 12 to perform one or more operations described herein. One or more units/modules of the controller 12 may be implemented, for example, based on one or more processors, one or more hardware components, and/or the instructions stored on the memory.

The controller 12 may control the synthetic image to be generated, for example, based on the received 2D image and 3D rendered image.

The controller 12 may control the labeling information for the target object to be extracted from the 3D data or the 3D rendered image.

The controller 12 may control the training dataset including the synthetic image and the labeling information for the target object to be generated.

The controller 12 may execute a program (hereinafter, referred to as a training dataset generating program) including control commands for performing a plurality of operations for evaluation of durability performance. The training dataset generating program is computer readable, and the storage 13 may comprise a computer-readable medium storing the training dataset generating program. Each of the components of the controller 12 shown in FIG. 1 may be defined based on each of the steps performed when the controller 12 executes the training dataset generating program. The controller 12 may include a rendering unit 121, an image synthesizing unit 122, a labeling unit 123 and a dataset generating unit 124.

A detailed operation of each component included in the controller 12 is described below.

The storage 13 may store the 2D image and the 3D data (e.g., received from the external device 3) in a database 131.

The storage 13 may store the training dataset generated by the control of the controller 12 in the database 132.

The object extraction system 2 may train the object extraction method, for example, based on the generated training dataset. The object extraction system 2 may include one or more processors and/or one or more hardware components (e.g., semiconductor devices, field programmable gate arrays (FPGAs), etc.) to implement the features of the object extraction system 2 described herein. The object extraction system 2 may include memory storing instructions that, when executed by the one or more processors and/or the one or more hardware components, cause the object extraction system 2 to perform one or more operations described herein. One or more units/modules of the object extraction system 2 may be implemented, for example, based on one or more processors, one or more hardware components, and/or the instructions stored on the memory.

The object extraction system 2 may determine a weight for a kernel of a neural network through the training, and may extract the classification, position or shape of the target object from the 2D image, for example, by using an object extraction algorithm based on the weight.

The object extraction system 2 may include at least one of: a classification module 21, a position detection module 22, or a segmentation module 23.

A detailed operation of each component included in the object extraction system 2 is described below.

FIG. 1 shows that the classification module 21, the position detection module 22, and the segmentation module 23 each receive the training dataset stored in the database 132. However, aspects are not limited thereto, and each module may receive the training dataset received through a separate communication interface/module (not shown) of the object extraction system 2.

The object extraction system 2 may be implemented by a deep learning training algorithm.

The deep learning training algorithm may include at least one of: a classification algorithm for extracting the classification of the target object from the input 2D image; a detection algorithm for extracting the position of the target object; or a segmentation algorithm for extracting the shape of the target object.

The deep learning training algorithm implementing the object extraction system 2 may be implemented based on a conventional deep learning training algorithm, an improvement thereof, or any other deep learning training algorithm.

The conventional deep learning training algorithm may be Faster R-CNN, Retina-NET, YOLO, Mask R-CNN, UNET, DEEPLAB V3, RESNET, or the like.

The external device 3 may include an input system 31 (e.g., an input interface and/or one or more input devices, such as a camera, a microphone, a keyboard, a touchscreen, a mouse, etc.).

The input system 31 may receive, from a user, data on the rotation angles and camera distances of the 2D image and the 3D data or those of the 3D rendered image.

The input system 31 may transfer, to the communicator 11, the data on the rotation angles and camera distances of the 2D image and the 3D data or those of the 3D rendered image.

Hereinafter, each operation of the rendering unit 121, the image synthesizing unit 122, the labeling unit 123 and the dataset generating unit 124 and a training dataset generating method will be described with reference to FIGS. 2 through 12.

Figure 2:
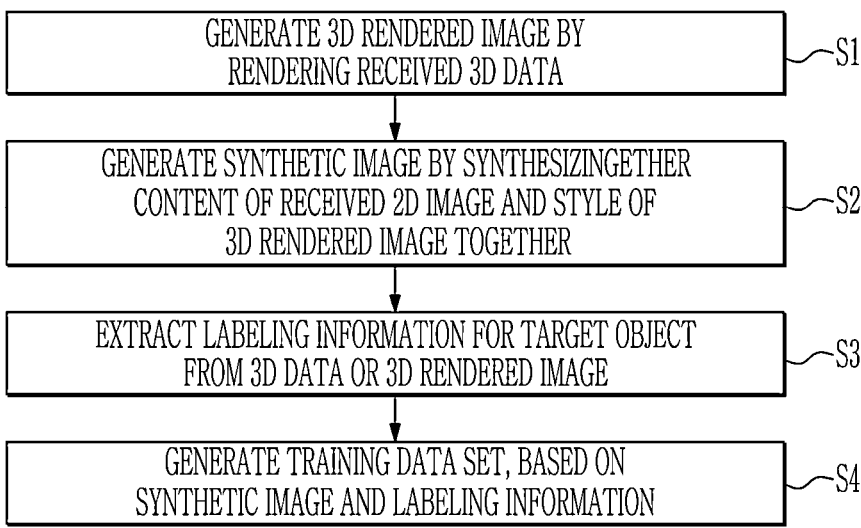
FIG. 2 is a flowchart of a training dataset generating method.

FIG. 2 is a flowchart of the training dataset generating method. The training dataset generating system 1, a modification thereof, or any other systems may perform the training dataset generating method.

The rendering unit 121 may generate a 3D rendered image by rendering received three-dimensional (3D) data (S1).

For convenience of explanation, the description describes that the rendering unit 121 generates one 3D rendered image, but aspects are not limited thereto. The rendering unit 121 may generate at least one 3D rendered image.

The rendering unit 121 may generate the 3D rendered image from the 3D data, for example, based on a rotation angle and a camera distance.

The rotation angle may have a value indicating a degree to which an assembly or a single object is rotated in a three-dimensional coordinate system with respect to an origin of the three-dimensional coordinate system, and may include parameters each representing at least one of: an a angle which is an x-axis rotation angle, a β angle which is a y-axis rotation angle, or an y angle which is a z-axis rotation angle.

The camera distance may be a distance from a reference point of a target object included in the 3D data to a virtual camera.

If a two-dimensional (2D) image is an assembly photo, the rendering unit 121 may generate an assembled rendered image by rendering 3D assembled data.

If the 2D image is a single object photo, the rendering unit 121 may generate a single rendered image by rendering 3D single data.

Hereinafter, it may be assumed that the 3D rendered image is the assembled rendered image or the single rendered image.

The rendering unit 121 may transfer the generated 3D rendered image to the image synthesizing unit 122 and the labeling unit 123.

The image synthesizing unit 122 may generate a synthetic image by synthesizing a content of the received 2D image and a style of the 3D rendered image together (S2).

The image synthesizing unit 122 may be implemented by a stylization algorithm.

The stylization algorithm may be an algorithm that can receive a content image and a style image, and generate a composite image in which a style similar to the style image is applied to a main shape similar to the content image.

Alternatively or additionally, the image synthesizing unit 122 may be implemented by an algorithm of a generative adversarial network (GAN) model.

The GAN model may use an algorithm in which a generator generating synthetic data that mimics real data and a discriminator distinguishing the real data from the synthetic data compete with each other, and the generator may generate a synthetic image of a level that it is difficult for the discriminator to distinguish whether the data is real or synthetic.

Hereinafter, the description describes that the image synthesizing unit 122 is implemented by the styling algorithm or the algorithm of the GAN model, but aspects are not limited thereto. The image synthesizing unit 122 may be implemented by various style conversion algorithms.

Hereinafter, an operation of the image synthesizing unit 122 implemented by the stylization algorithm and a detailed sequence of step S2 implemented by the stylization algorithm will be described with reference to FIGS. 3 to 6.

Figure 3:
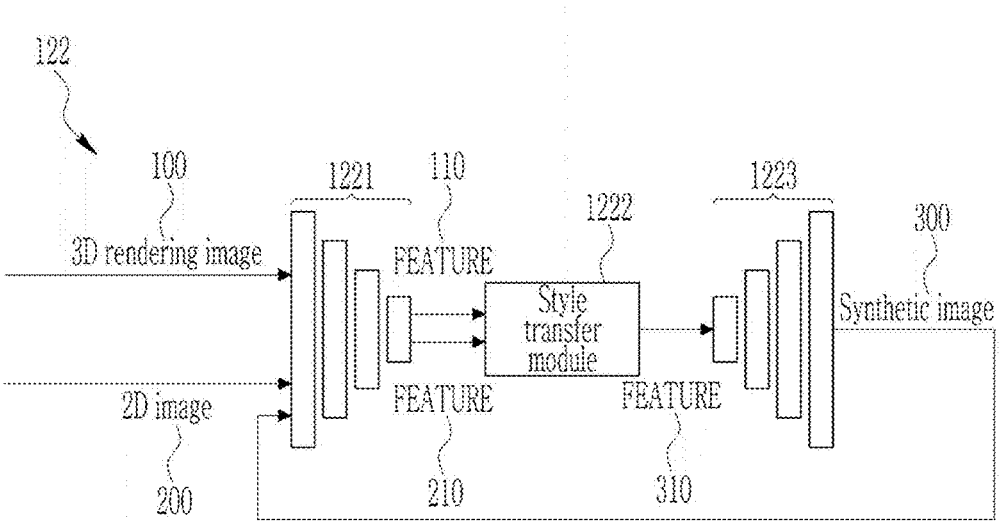
FIG. 3 is a block diagram schematically showing a training operation of an image synthesizing unit implemented by a stylization algorithm.

FIG. 3 is a block diagram schematically showing the training operation of the image synthesizing unit implemented by a stylization algorithm.

The image synthesizing unit 122 may include an encoder 1221, a style transfer module 1222, and a decoder 1223.

The image synthesizing unit 122 may generate the synthetic data by synthesizing a 2D image 200 and a 3D rendered image 100 together to apply a color distribution of the 2D image 200 to the 3D rendered image 100.

The encoder 1221 may extract a content feature 110 from the received 3D rendered image 100 and extract a style feature 210 from the 2D image 200.

The style transfer module 1222 may generate a synthetic feature 310 by synthesizing the content feature 110 extracted from the 3D rendered image 100 and the style feature 210 extracted from the 2D image 200 together.

The decoder 1223 may train how to generate the synthetic image 300 similar to the 2D image 200 from the synthetic feature 310.

The decoder 1223 may include a plurality of deconvolutional layers for sequential deconvolution of the synthetic feature 310 (e.g., by using a convolutional neural network (CNN), an improvement thereof, or any other neural network).

The decoder 1223 may determine weights of a plurality of first kernels corresponding to the plurality of deconvolutional layers through the training.

The encoder 1221 may extract the respective features of the synthetic image 300 (e.g., generated by the decoder 1223) and the 2D image 200. The decoder 1223 may determine the weights of the plurality of first kernels for the features of the 2D image 200 and the synthetic image 300 to be similar to each other.

The decoder 1223 may use a loss function as an index of a neural network performance in order to obtain an optimal weight.

For example, the decoder 1223 may use a mean absolute error (MAE) as the loss function or any other loss function.

Figure 4:
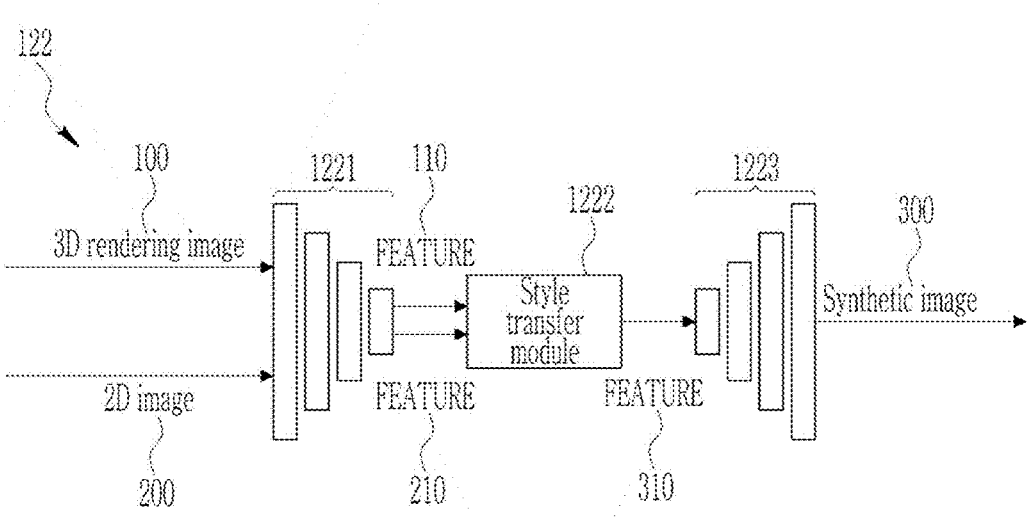
FIG. 4 is a block diagram schematically showing an operation of the image synthesizing unit to which a weight determined by the training shown in FIG. 3 is applied.

FIG. 4 is a block diagram schematically showing the operation of the image synthesizing unit to which the weight determined by the training shown in FIG. 3 is applied.

The decoder 1223 may generate the synthetic image 300 from the synthetic feature 310, based on the weights of the plurality of first kernels determined through the training as described above.

Figure 5A:
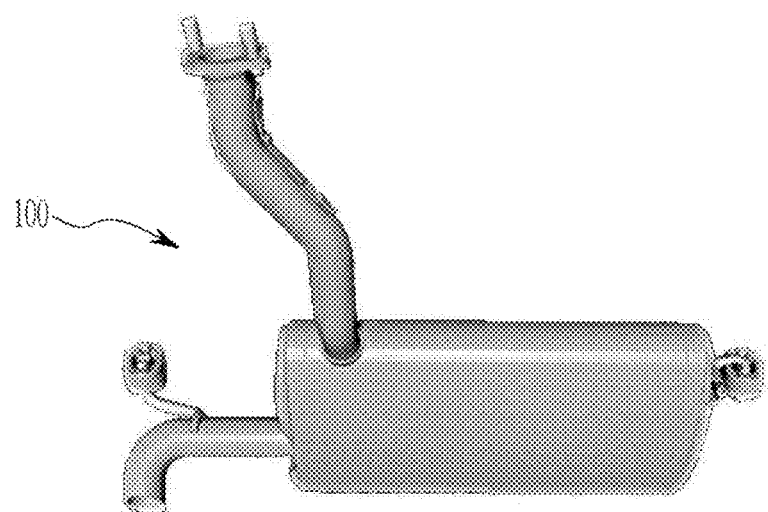
FIGS. 5A, 5B and 5C are exemplary views for respectively showing a three-dimensional (3D) rendered image, a two-dimensional (2D) image, and a synthetic image, shown in FIG. 4.
Figure 5B:
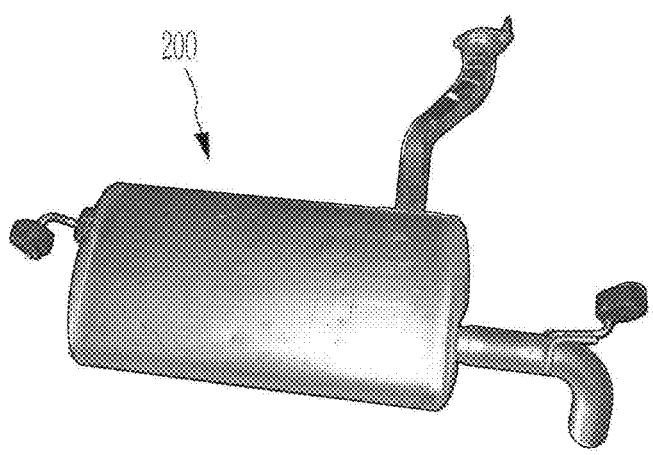
Figure 5C:
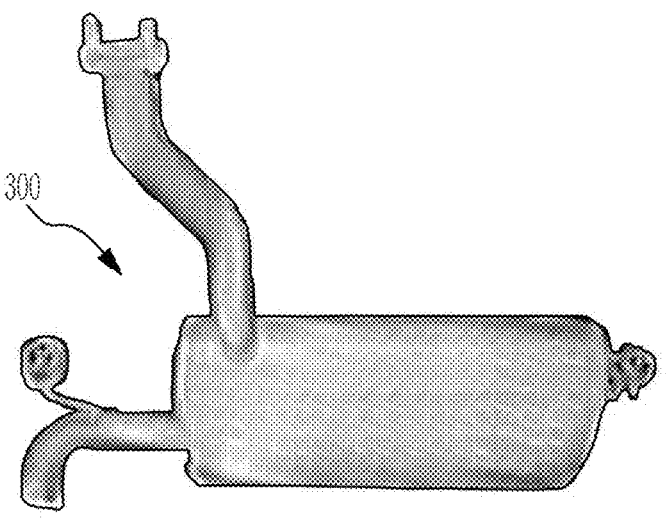

FIGS. 5A, 5B and 5C are exemplary views for respectively showing the three-dimensional (3D) rendered image, the two-dimensional (2D) image, and the synthetic image, shown in FIG. 4.

The image synthesizing unit 122 (e.g., including the encoder 1221, the style transfer module 1222, and the decoder 1223) may generate the synthetic image 300 shown in FIG. 5C, for example, based on the 3D rendered image 100 shown in FIG. 5A and the 2D image 200 shown in FIG. 5B.

The synthetic image 300 may be an image in which a color distribution similar to the color distribution of the 2D image 200, such as a texture or a color, is combined with a composition similar to the composition of the 3D rendered image 100.

As shown in FIG. 5C, the synthetic image 300 may have a surface having the color distribution of the 2D image 200, which is different from its smooth surface shown in the 3D rendered image 100.

FIG. 6 is a detailed flowchart for explaining step S2 of FIG. 2 implemented by the stylization algorithm.

The encoder 1221 may extract the style feature 210 from the 2D image 200 by having the received 2D image 200 input thereto (S21).

The encoder 1221 may extract the content feature 110 from the 3D rendered image 100 by having the received 3D rendered image 100 input thereto (S22).

For example, FIG. 6 shows that step S22 is performed after step S21, but aspects are not limited thereto. For example, step 22 may be performed before step S21 or performed simultaneously with step S22. One or more other steps may be performed in a sequence that is different from the sequence shown in FIG. 6.

The style transfer module 1222 may generate the synthetic feature 310 by synthesizing the style feature 210 and the content feature 110 together (S23).

The decoder 1223 may determine the weights of the plurality of first kernels by training a method for generating the synthetic image 300 from the synthetic feature 310 (S24).

The decoder 1223 may generate the synthetic image 300 by performing the deconvolution of the synthetic feature 310 by using the plurality of deconvolutional layers corresponding to the plurality of first kernels.

The decoder 1223 may transfer the generated synthetic image 310 to the encoder 1221.

The encoder 1221 may extract a first feature from the received synthetic image 310 and extract a second feature from the 2D image 200.

The decoder 1223 may determine the weights of the plurality of first kernels for the first feature received from the encoder 1221 to be similar to the second feature.

The decoder 1223 may generate the synthetic image 300 from the synthetic feature 310, for example, based on the weights of the plurality of first kernels determined through the training (S25).

Hereinafter, the operation of the image synthesizing unit 122 implemented by the algorithm of the GAN model and a detailed sequence of step S2 implemented by the algorithm of the GAN model will be described with reference to FIGS. 7 to 10.

Figure 7:
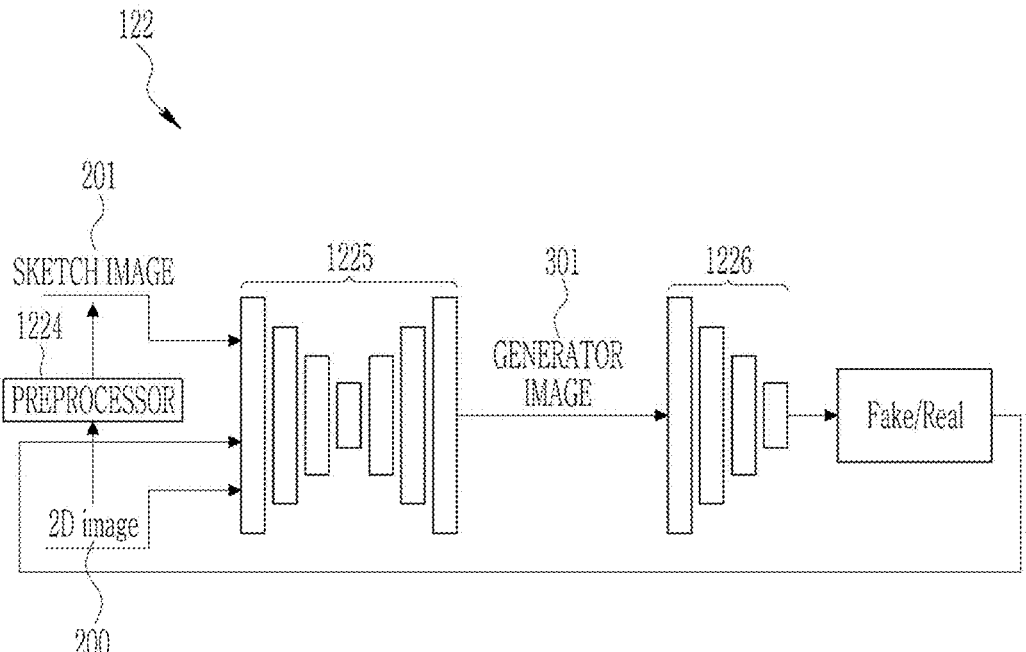
FIG. 7 is a block diagram schematically showing the training operation of the image synthesizing unit implemented by an algorithm of a generative adversarial network (GAN) model.

FIG. 7 is a block diagram schematically showing the training operation of the image synthesizing unit implemented by the algorithm of the generative adversarial network (GAN) model.

The image synthesizing unit 122 may include a preprocessor 1224, a generator 1225, and a discriminator 1226.

Here, the generator 1225 may be a generator using the GAN algorithm, and the discriminator 1226 may be a discriminator using the GAN algorithm.

Accordingly, the generator 1225 and the discriminator 1226 may be implemented by the neural network.

The generator 1225 may generate a generator image 301, and the discriminator 1226 may analyze the generator image 301 and the 2D image 200 to classify the generator image 301 into one of classification categories (e.g., into one of "Fake" and "Real" according to whether the generator image 301 and the 2D image 200 match each other), for example, in a training process.

The generator 1225 may perform the training to generate the generator image 301 to increase a ratio of a first classification category (e.g., "Real") in classifying the generator image 301 into one of the classification categories (e.g., "Fake" and "Real") by the discriminator 1226.

The preprocessor 1224 may have the 2D image 200 input thereto and convert the image to a sketch-style image to generate a sketch image 201. The preprocessor 1224 may be implemented by a contour extraction algorithm such as XDoG or Canny Edge Detection.

The generator 1225 may train how to convert the sketch image 201 to the 2D image 200.

The generator 1225 may generate the generator image 301 synthesized from the sketch image 201.

The generator 1225 may output the plurality of synthesized generator images 301 by inputting the sketch image 201 into the GAN algorithm, for example, in a training process.

Here, the plurality of synthesized generator images 301 may be images similar to the 2D image 200.

The generator 1225 may be implemented by the CNN.

Here, the CNN may include a plurality of convolutional layers for sequentially converting the sketch image 201 to the generator image 301.

The generator 1225 may determine weights of a plurality of second kernels corresponding to the plurality of convolutional layers through the training.

The generator 1225 may repeatedly generate the generator image 301 and transmit the same to the discriminator 1226 (e.g., through one or more iterations of the process shown in FIG. 7).

The discriminator 1226 may compare the generator image 301 with the 2D image 200 to determine whether similarity between the generator image 301 and the 2D image 200 corresponds to the first classification category (e.g., "Real") that is greater than or equal to a predetermined similarity threshold, or the similarity between the generator image 301 and the 2D image 200 corresponds to a second classification category (e.g., "Fake") that is less than the predetermined similarity threshold.

The similarity between the two images may indicate a degree to which the two images are the same as each other.

The discriminator 1226 may calculate the similarity between the generator image 301 and the 2D image 200 by comparing respective various criteria (e.g., pixel values, pixel structures, color distributions, etc.) of the generator image 301 and the 2D image 200.

The discriminator 1226 may compare the color distribution of the generator image 301 and the color distribution of the 2D image 200. The discriminator 1226 may provide a feedback by providing a determination result for the generator image 301 to the generator 1225.

For example, the determination result for the generator image 301 may include a ratio of the first classification category, a ratio of the second classification category, a ratio of the first classification category to the second classification category (e.g., a ratio of "Real" to "Fake," or vice versa), etc.

The discriminator 1226 may derive the ratio of "Fake" to "Real," for example, based on the determination result for the generator image 301 and transmit the derived ratio to the generator 1225.

The generator 1225 may determine the weights of the plurality of second kernels corresponding to the plurality of convolutional layers, for example, based on the feedback.

The generator 1225 may perform a training process to generate the generator image 301 for the determination result to include an increased ratio of "Real" among "Fake" and "Real," for example, based on the feedback.

For example, the generator 1225 may repeat the training process until the ratio of received "Fake" is less than or equal to a predetermined threshold.

The generator 1225 may use the loss function as the index of the neural network performance in order to obtain the optimal weight.

For example, the generator 1225 may use the mean absolute error (MAE) as the loss function or any other loss function.

Figure 8:
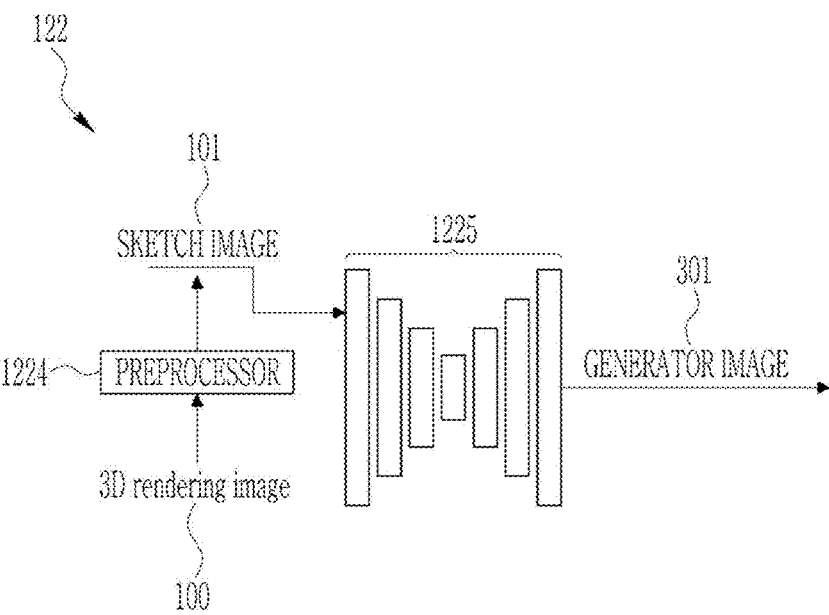
FIG. 8 is a block diagram schematically showing an operation of the image synthesizing unit to which a weight determined by the training shown in FIG. 7 is applied.

FIG. 8 is a block diagram schematically showing the operation of the image synthesizing unit to which the weight determined by the training shown in FIG. 7 is applied.

The preprocessor 1224 may have the 3D rendered image 100 input thereto and convert the same to the sketch-style image to generate the sketch image 101.

The preprocessor 1224 may be implemented by the contour extraction algorithm such as XDoG or Canny Edge Detection.

The generator 1225 may generate the generator image 301 from the sketch image 101, for example, based on the weights of the plurality of second kernels determined through the training as described above.

Figure 9A:
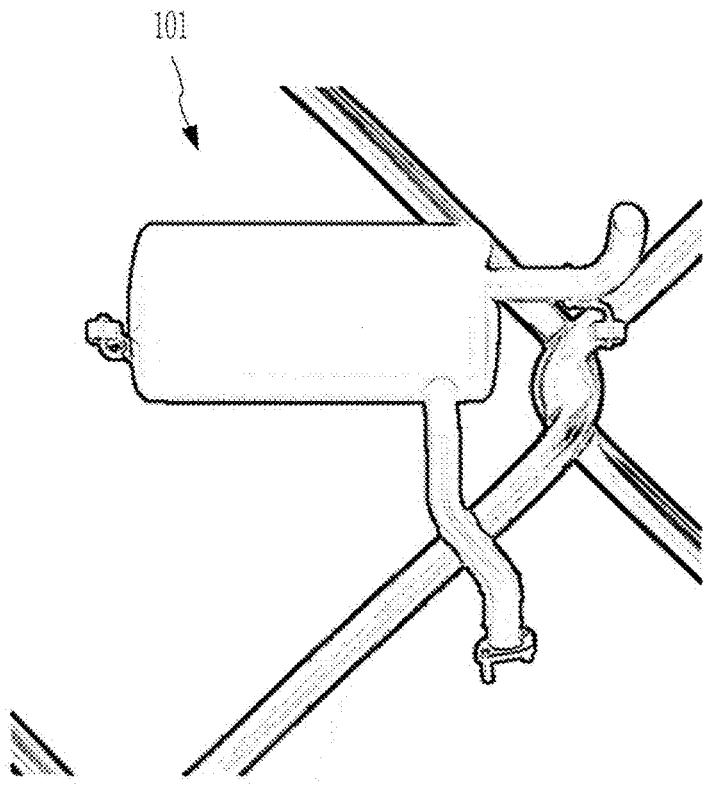
FIGS. 9A, 9B and 9C are exemplary views for respectively showing a sketch image, a two-dimensional (2D) image and a synthetic image, shown in FIGS. 7 and 8.
Figure 9B:
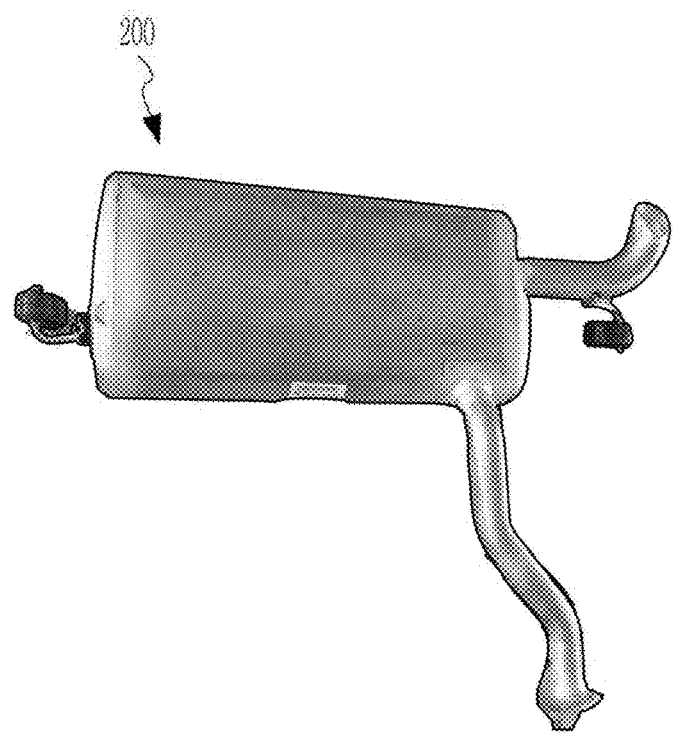
Figure 9C:
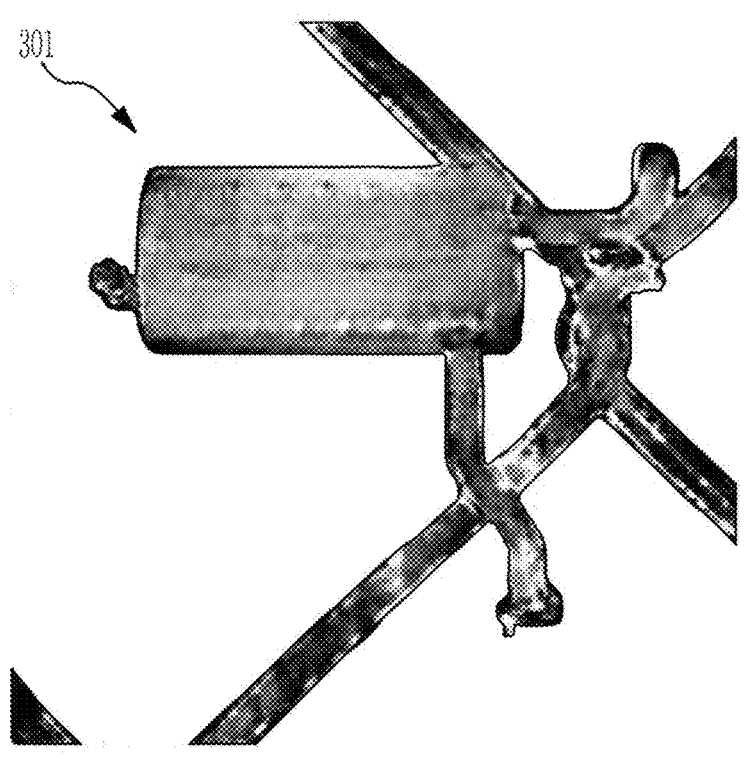

FIGS. 9A, 9B and 9C are exemplary views for respectively showing the sketch image, the two-dimensional (2D) image, and the synthesized generator image, shown in FIGS. 7 and 8.

The image synthesizing unit 122 (e.g., including the generator 1225 and the discriminator 1226) may generate the generator image 301 shown in FIG. 9C, for example, based on the sketch image 101 shown in FIG. 9A and the 2D image 100 shown in FIG. 9B.

The generator image 301 may be an image in which a composition similar to the composition of the sketch image 101 is combined with a color distribution similar to the color distribution of the 2D image 200 such as a texture and a color.

As shown in FIG. 9C, the generator image 301 may have a surface having the color distribution of the 2D image 200, which is different from a smooth surface of the sketch image 101.

FIG. 10 is a detailed flowchart for explaining step S2 of FIG. 2 implemented by the algorithm of the GAN model.

Hereinafter, description of some features similar to the previous description among the descriptions with respect to the preprocessor 1224, the generator 1225, and/or the discriminator 1226 may be omitted. However, the omitted descriptions may also be applicable for the features associated with FIGS. 7-12.

The preprocessor 1224 may generate the sketch image 201 by converting the 2D image 200 to the sketch-style image (S26).

The generator 1225 may determine the weights of the plurality of second kernels by training a method for converting the sketch image 201 to the 2D image 200 (S27).

The generator 1225 may generate the generator image 301 from the sketch image 201.

The generator 1225 may transfer the generator image 301 to the discriminator 1226.

The discriminator 1226 may compare the received generator image 301 with the 2D image 200 to determine whether the similarity between the generator image 301 and the 2D image 200 corresponds to the first classification category (e.g., "Real") that is greater than or equal to the predetermined similarity threshold, or the similarity between the generator image 301 and the 2D image 200 corresponds to the second classification category (e.g., "Fake") that is less than the predetermined similarity threshold.

The discriminator 1226 may provide a feedback by providing a determination result for the plurality of generator images 301 to the generator 1225.

The generator 1225 may determine the weights of the plurality of second kernels corresponding to the plurality of convolutional layers, for example, based on the feedback.

The generator 1225 may perform the training to generate the generator image 301 for the determination result to include an increased ratio of the first classification category (e.g., "Real") among the first and second classification categories (e.g., "Fake" and "Real"), for example, based on the feedback.

The preprocessor 1224 may generate the sketch image 101 by converting the 3D rendered image 100 to the sketch-style image (S28).

The generator 1225 may generate the generator image 301 from the sketch image 101 based on the 3D rendered image 100 (S29). The generator 1225 may generate the generator image 301, for example, based on the weights of the plurality of second kernels determined through the training (S29).

The image synthesizing unit 122 may transfer the synthetic image 300 generated in step S25 or the generator image 301 generated in step S29 to the dataset generating unit 124.

Hereinafter, the synthetic image may be referred to as the synthetic image 300 generated in step S25 or the generator image 301 generated in step S29.

Referring back to FIG. 2, the labeling unit 123 may extract labeling information for the target object from the 3D data or 3D rendered image (S3).

The labeling unit 123 may extract data indicating a classification of a target object from the 3D data as classification labeling information.

The labeling unit 123 may transfer the extracted classification labeling information to the dataset generating unit 124.

The labeling unit 123 may extract the shape labeling information and position labeling information for the target object from the 3D data or 3D rendered image.

Hereinafter, the description separately describes a case where the 2D image is the assembly photo or the single object photo.

If the 2D image is the assembly photo, the labeling unit 123 may extract labeling information for the assembly object from the 3D assembly data and 3D single data.

If the 2D image is the single object photo, the labeling unit 123 may extract labeling information for the single object from the 3D rendered data.

Step S3 may include extracting, by the labeling unit 123, labeling information for the assembly object from the 3D assembly data and 3D single data (S31) if the 2D image is the assembly photo, and/or extracting, by the labeling unit 123, labeling information for the single object from the single rendered image (S32) if the 2D image is the single object photo.

Hereinafter, the respective operations of the labeling unit 123 for steps S31 and S32 will be described with reference to FIGS. 11 and 12, respectively. The operations of the labeling unit 123 for step S31 (e.g., shown in FIG. 11) may be performed, for example, if the 2D image is the assembly photo, and the operations of the labeling unit 123 for step S32 (e.g., shown in FIG. 12) may be performed, for example, if the 2D image is the single object photo.

FIG. 11 shows an example flowchart for step S31.

The labeling unit 123 may generate target removal data by removing the assembly object from the assembly indicated by the 3D assembly data (S311).

The target removal data may be the 3D data from which data indicating the assembly object is removed from the 3D assembly data.

The labeling unit 123 may generate black data by converting a color indicated by the target removal data to a black color (S312).

The labeling unit 123 may generate an object-rendered image, for example, based on the black data and the 3D single data (S313).

The labeling unit 123 may generate 3D object data by combining the 3D single data with the black data.

The 3D object data may show only the assembly object positioned on a black background, thereby providing an improved identification.

The labeling unit 123 may generate the object-rendered image by rendering the 3D object data.

The rotation angle and/or camera distance applied to the object-rendered image may be the same as the rotation angle and/or camera distance applied to the 3D rendered image in step S1.

A portion obscured by another object may occur in the assembly object represented by the 3D object data.

The labeling unit 123 may use the black data to extract the rest of the assembly object, covered by another object.

The labeling unit 123 may extract, from the object-rendered image, assembly shape labeling information corresponding to contour information for the assembly object (S314).

The labeling unit 123 may extract the contour information for the assembly object from the object-rendered image.

The labeling unit 123 may be implemented by an algorithm for extracting a contour of the object.

The assembly shape labeling information may be labeling information necessary for segmentation of the assembly object from an image.

The assembly shape labeling information may be information indicating a polygon that is a contour of the object-rendered image.

The labeling unit 123 may extract, from the contour information for the assembly object, assembly position labeling information corresponding to information indicating the horizontal upper limit, horizontal lower limit, vertical upper limit and vertical lower limit of the contour information (S315).

The labeling unit 123 may be implemented by an algorithm for detecting a position of the object.

The assembly position labeling information may be labeling information necessary for detection of the assembly object from an image.

The assembly position labeling information may be information indicating a bounding box used to specify a position of the assembly object.

The assembly position labeling information may include information respectively indicating the horizontal upper limit ($X_{max}$), a horizontal lower limit ($X_{min}$), a vertical upper limit ($Y_{max}$), and a vertical lower limit ($Y_{min}$).

The labeling unit 123 may extract the assembly shape labeling information and the assembly position labeling information, by using a logic of a 3D object extraction library such as OPEN 3D and Open CV in steps S314 and S315, but aspects of the present disclosure are not limited thereto.

The labeling unit 123 may transfer a first dataset (e.g., including at least one of: the extracted assembly shape labeling information or the extracted assembly position labeling information) to the dataset generating unit 124.

Next, step S32 is described with reference to FIG. 12.

FIG. 12 shows an example flowchart for step S32.

The labeling unit 123 may extract single shape labeling information corresponding to contour information for the single object, for example, from the single rendered image received from the rendering unit 121 (S321).

The labeling unit 123 may extract the contour information and single shape labeling information for the single object, for example, from the single rendered image in the same manner as in step S314.

The single shape labeling information may be information indicating a polygon that is a contour of the single rendered image.

The labeling unit 123 may extract, from the contour information for the single object, single position labeling information corresponding to information indicating the horizontal upper limit, horizontal lower limit, vertical upper limit and vertical lower limit of the contour information (S322).

The labeling unit 123 may extract the single position labeling information in the same manner as in step S315.

The labeling unit 123 may transfer a second dataset (e.g., including at least one of: the extracted single shape labeling information or the extracted single position labeling information) to the dataset generating unit 124.

The shape labeling information may be at least one of: the assembly shape labeling information or the single shape labeling information.

The position labeling information may be at least one of: the assembly position labeling information or the single position labeling information.

Referring back to FIG. 2, the dataset generating unit 124 may generate the training dataset, for example, based on the synthetic image received from the image synthesizing unit 122 and the labeling information received from the labeling unit 123 (S4).

The dataset generating unit 124 may generate the training dataset by labeling the synthetic image received from the image synthesizing unit 122, for example, based on the labeling information extracted from the labeling unit 123.

The dataset generating unit 124 may generate the training data by matching synthetic image with at least one of: the corresponding classification labeling information; position labeling information; or shape labeling information.

The dataset generating unit 124 may generate classification training data by matching the corresponding classification labeling information to the synthetic image.

The dataset generating unit 124 may generate position training data by matching the corresponding position labeling information to the synthetic image.

The position labeling data may be data representing the position labeling information among the first dataset or the second dataset.

The dataset generating unit 124 may generate shape training data by matching the corresponding shape labeling data to the synthetic image.

The shape labeling data may be data representing the shape labeling information among the first dataset or the second dataset.

The storage 13 may store the training dataset generated by the dataset generating unit 124 in the database 132.

Hereinafter, the detailed operation of each component of the object extraction system 2 will be described.

The object extraction system 2 may include at least one of: the classification module 21; the position detection module 22; or the segmentation module 23.

The classification module 21 may be implemented by the classification algorithm for extracting the classification of the target object (e.g., by using the CNN or any other neural network).

The classification module 21 may train a method for extracting the classification of the target object from the synthetic image, for example, based on at least one classification training dataset generated by the training dataset generating system 1.

The classification module 21 may include the plurality of convolutional layers for the sequential convolution of the synthetic image.

The classification module 21 may determine the weights of the plurality of kernels corresponding to the plurality of convolutional layers through the training.

The classification module 21 may extract the classification of the target object from the 2D image, for example, based on the weights of the plurality of kernels determined through the training in this manner.

The position detection module 22 may be implemented by the detection algorithm for extracting the position of the target object (e.g., by using the CNN or any other neural network).

The position detection module 22 may train a method for extracting the position of the target object from the synthetic image, for example, based on at least one position training dataset generated by the training dataset generating system 1.

The position detection module 22 may include the plurality of convolutional layers for the sequential convolution of the synthetic image.

The position detection module 22 may determine the weights of the plurality of kernels corresponding to the plurality of convolutional layers through the training.

The position detection module 22 may extract the position of the target object from the 2D image, for example, based on the weights of the plurality of kernels determined through the training in this manner.

The segmentation module 23 may be implemented by the segmentation algorithm for extracting the shape of the target object (e.g., by using the CNN or any other neural network).

The segmentation module 23 may train a method for extracting the shape of the target object from the synthetic image, for example, based on at least one shape training dataset generated by the training dataset generating system 1.

The segmentation module 23 may include the plurality of convolutional layers for the sequential convolution of the synthetic image.

The segmentation module 23 may determine the weights of the plurality of kernels corresponding to the plurality of convolutional layers through the training.

The segmentation module 23 may extract the shape of the target object from the 2D image, for example, based on the weights of the plurality of kernels determined through the training in this manner.

A deep learning training based on the training dataset may be implemented, for example, if the labeling unit 123 automatically extracts the labeling information from the 3D data rather than a person puts the labeling information therein, under a condition that there is the 3D data for the target object to be extracted.

As described above, an unsupervised training is possible under the condition that there is the 3D data. In other words, the conditional unsupervised training may also correspond to the training described herein.

A training dataset generating system may include a controller controlling a training dataset including a synthetic image and labeling information to be generated based on a two-dimensional (2D) image obtained by photographing a target object and a three-dimensional (3D) data for the target object, wherein the controller includes: a rendering unit generating a rendered image from the 3D data, an image synthesizing unit generating the synthetic image, based on the 2D image and the rendered image, through deep learning training, a labeling unit extracting labeling information for the target object based on the 3D data or the rendered image, and a dataset generating unit generating the training dataset including the synthetic image and the labeling information.

The image synthesizing unit may include: an encoder extracting respective features from the 2D image and the rendered image, a style transfer module generating a synthetic feature by synthesizing the features together, and a decoder generating the synthetic image based on the synthetic feature through the training.

The decoder may include a plurality of deconvolutional layers for deconvolution of the synthetic feature, and determine weights of a plurality of kernels corresponding to the plurality of deconvolutional layers through the training.

The decoder may generate the synthetic image in which a content of the 2D image and a style of the rendered image are synthesized together from the synthetic feature, based on the weights of the plurality of kernels.

The image synthesizing unit may include: a preprocessor converting the 2D image to a first sketch image, a generator generating a generator image from the first sketch image through the training, and a discriminator calculating similarity between the generator image and the 2D image, determines whether the similarity is greater than or equal to a predetermined threshold, and feeds back a determined result to the generator.

The generator may include a plurality of convolutional layers for converting the first sketch image to the generator image, and determine weights of a plurality of kernels corresponding to the plurality of convolutional layers, based on the feedback.

The preprocessor may convert the rendered image to a second sketch image, and the generator may generate the synthetic image from the second sketch image, based on the weights of the plurality of kernels.

The labeling unit may extract classification labeling information for the target object from the 3D data.

When the 2D image is a color photo obtained by photographing a region including an assembly in which the target object is assembled with another object, the 3D data may include assembly data indicating the assembly and single data indicating only the target object, and the labeling unit may extract shape labeling information for the target object and position labeling information for the target object from an object-rendered image generated based on the assembly data and the single data.

When the 2D image is a color photo obtained by photographing only the target object, the labeling unit may extract shape labeling information for the target object and position labeling information for the target object from contour information for the target object shown in the rendered image.

A training dataset generating method for generating a training dataset based on a two-dimensional (2D) image obtained by photographing a target object and a three-dimensional (3D) data for the target object, may include: generating, by control of a controller, a rendered image by rendering the 3D data, generating, by the control of the controller, a synthetic image by synthesizing a content of the 2D image and a style of the rendered image together, extracting, by the control of the controller, labeling information for the target object from the 3D data or the rendered image, and generating, by the control of the controller, a training dataset based on the synthetic image and the labeling information.

The generating of the synthetic image may include: extracting, by the control of the controller, a style feature from the 2D image, extracting, by the control of the controller, a content feature from the rendered image, generating, by the control of the controller, a synthetic feature by synthesizing the style feature and the content feature together, and training, by the control of the controller, a method for generating the synthetic image from the synthetic feature.

The training of the method for generating the synthetic image from the synthetic feature may include: determining weights of a plurality of kernels corresponding to a plurality of deconvolutional layers for deconvolution of the synthetic feature, and generating the synthetic image from the synthetic feature, based on the weights of the plurality of kernels.

The generating of the synthetic image may further include generating the synthetic image included in the training dataset from the synthetic feature, based on weights of a plurality of kernels determined through the training.

The generating of the synthetic image may include: generating, by the control of the controller, a first sketch image by converting the 2D image to a sketch style, determining, by the control of the controller, weights of a plurality of kernels corresponding to a plurality of deconvolutional layers by training a method for converting the first sketch image to the 2D image through training, generating, by the control of the controller, a second sketch image by converting the rendered image to the sketch style, and generating, by the control of the controller, the synthetic image from the second sketch image, based on the weights of the plurality of kernels.

The determining of the weights of the plurality of kernels may include: generating a generator image from the first sketch image, calculating similarity between the generator image and the 2D image, determining whether the similarity is greater than or equal to a predetermined threshold, and determining weights of a plurality of kernels corresponding to the plurality of convolutional layers, based on a determined result.

The generating of the synthetic image may further include generating the synthetic image included in the training dataset from the second sketch image, based on the weights of the plurality of kernels determined through the training.

The extracting of the labeling information for the target object may include extracting classification labeling information for the target object from the 3D data.

When the 2D image is a color photo obtained by photographing a region including an assembly in which the target object is assembled with another object, the 3D data may include assembly data indicating the assembly and single data indicating only the target object, and the extracting of the labeling information for the target object may include: generating, by the control of the controller, target removal data by removing the target object from the assembly, generating, by the control of the controller, black data by converting a color indicated by the target removal data to a black color, generating, by the control of the controller, 3D object data by combining the black data with the single data, and generating, by the control of the controller, an object-rendered image by rendering the 3D object data.

The extracting of the labeling information for the target object may further include extracting, by the control of the controller, shape labeling information corresponding to contour information for the target object from the object-rendered image.

The extracting of the labeling information for the target object may further include extracting, by the control of the controller, position labeling information corresponding to information indicating the horizontal upper limit, horizontal lower limit, vertical upper limit and vertical lower limit of the contour information for the target object.

When the 2D image is a color photo obtained by photographing only the target object, the extracting of the labeling information for the target object may include extracting, by the control of the controller, shape labeling information corresponding to contour information for the target object from the rendered image.

The extracting of the labeling information for the target object may further include extracting, by the control of the controller, the shape labeling information for the target object and position labeling information for the target object from the contour information for the target object.

A non-transitory computer-readable recording medium having stored thereon a program for performing a training dataset generating method for generating a training dataset based on a two-dimensional (2D) image obtained by photographing a target object and a three-dimensional (3D) data for the target object, may include: generating, by control of a controller, a rendered image by rendering the 3D data, generating, by the control of the controller, a synthetic image by synthesizing a content of the 2D image and a style of the rendered image together, extracting, by the control of the controller, labeling information for the target object from the 3D data or the rendered image, and generating, by the control of the controller, a training dataset based on the synthetic image and the labeling information.

One or more features described herein provide various advantages and improvements. For example, the training data set associated with one or more synthetic images may be used in various systems to provide improved image recognition, improved image data storage management, etc. In an example, vehicles may capture a 2D image while driving and may communicate the image and/or 3D data via wireless communication. The training may be performed by one or more computing devices, such as devices in vehicles, servers, or any other devices in a communication network (or the training may be at least partially performed by the vehicles), and the vehicles may ultimately use the training dataset for various purposes (e.g., updating digital maps in the vehicle with the synthetic images, recognizing faults from the vehicle, etc.). Image processing efficiencies and image recognition may be improved by using the synthetic images and updated training data sets. For example, in autonomous driving, false positives and/or false negatives may be reduced in determining potential traffic risks by using synthetic images and updated training data sets. Further, in some configurations implementing one or more features described above, the detection of malfunctions of one or more parts (e.g., vehicle parts or any other parts of mechanical devices) may be improved.

Although various examples of the present disclosure have been described in detail hereinabove, the scope of the present invention is not limited thereto. Various modifications and improvements made by those skilled in the art to which the present invention pertains also belong to the scope of the present invention.

What is claimed is:
1. A training dataset generating system comprising:
a communication interface to receive a two-dimensional (2D) image obtained by photographing a target object; and
a controller circuit configured to generate, based on the 2D image and based on three-dimensional (3D) data for the target object, a training dataset comprising a synthetic image and comprising labeling information, wherein the controller circuit is configured to generate the training data set by:

generating, based on the 3D data, a rendered image;

generating the synthetic image by synthesizing a style of the 2D image and a content of the rendered image, through a trained deep learning model;

extracting, based on at least one of the 3D data or the rendered image, the labeling information for the target object; and generating the training dataset, and wherein the controller circuit is configured to:

extract, via an encoder, one or more first features from the 2D image and one or more second features from the rendered image;

generate a synthetic feature by synthesizing the one or more first features and the one or more second features; and generate, via a decoder, the synthetic image, based on the synthetic feature, through the trained deep learning model, wherein the decoder comprises a plurality of deconvolutional layers for deconvolution of the synthetic feature, and is configured to determine weights of a plurality of kernels corresponding to the plurality of deconvolutional layers through the trained deep learning model, and wherein the decoder is configured to generate, based on the weights of the plurality of kernels and based on the synthetic feature, the synthetic image.

2. The training dataset generating system of claim 1, wherein the controller circuit is configured to:

convert, via a preprocessor, the 2D image to a first sketch image;

generate a generator image of a generator, based on the first sketch image, through the trained deep learning model; and determine similarity between the generator image and the 2D image, to determine whether the similarity is greater than or equal to a threshold, and to send, to the image generator as a feedback, a determined result associated with the similarity.

3. The training dataset generating system of claim 2, wherein the generator comprises a plurality of convolutional layers to convert the first sketch image to the generator image, and determines, based on the feedback, weights of a plurality of kernels corresponding to the plurality of convolutional layers.

4. The training dataset generating system of claim 3, wherein the preprocessor converts the rendered image to a second sketch image, and the generator generates, based on the weights of the plurality of kernels and based on the second sketch image, the synthetic image.

5. The training dataset generating system of claim 1, wherein the controller circuit is configured to extract, from the 3D data, classification labeling information for the target object.

6. The training dataset generating system of claim 1, wherein the 2D image comprises a color photo obtained by photographing a region comprising an assembly in which the target object is assembled with another object, wherein the style of the 2D image comprises texture and color information of the target object in the 2D image, the 3D data comprises assembly data indicating the assembly and single data indicating the target object, and the controller circuit is configured to extract shape labeling information for the target object and position labeling information for the target object from an object-rendered image generated based on the assembly data and the single data.

7. The training dataset generating system of claim 1, wherein the 2D image comprises a color photo obtained by photographing a region comprising the target object not assembled with another object, and the controller circuit is configured to extract shape labeling information for the target object and position labeling information for the target object from contour information for the target object shown in the rendered image.

8. A training dataset generating method comprising:

generating, based on a two-dimensional (2D) image obtained by photographing a target object and based on three-dimensional (3D) data for the target object, a training dataset, wherein the generating comprises:

generating, by a controller circuit, a rendered image by rendering the 3D data;

generating, by the controller circuit, a synthetic image by synthesizing a style of the 2D image and a content of the rendered image together through a trained deep learning model;

extracting, by the controller circuit and from the 3D data or from the rendered image, labeling information for the target object; and generating, by the controller circuit and based on the synthetic image and the labeling information for the target object, the training dataset, wherein the generating of the synthetic image comprises:

extracting, by the controller circuit and via an encoder, a style feature from the 2D image and a content feature from the rendered image;

generating, by the controller circuit, a synthetic feature by synthesizing the style feature and the content feature together; and generating, via a decoder, the synthetic image, based on the synthetic feature, through the trained deep learning model, wherein the decoder comprises a plurality of deconvolutional layers for deconvolution of the synthetic feature, and determines weights of a plurality of kernels corresponding to the plurality of deconvolutional layers through the trained deep learning model, and wherein the decoder generates, based on the weights of the plurality of kernels and based on the synthetic feature, the synthetic image.

9. The training dataset generating method of claim 8, wherein the generating of the synthetic image comprises:

training, by the controller circuit and based on the synthetic feature, a method for generating the synthetic image.

10. The training dataset generating method of claim 9, wherein the training of the method for generating the synthetic image comprises:

determining weights of a plurality of kernels corresponding to a plurality of deconvolutional layers for deconvolution of the synthetic feature; and generating, based on the synthetic feature and based on the weights of the plurality of kernels, the synthetic image.

11. The training dataset generating method of claim 9, wherein the generating of the synthetic image further comprises generating, based on the synthetic feature and based on weights of a plurality of kernels determined through the training, a synthetic image included in the training dataset.

12. The training dataset generating method of claim 8, wherein the generating of the synthetic image comprises:

generating, by the controller circuit, a first sketch image by converting, based on a sketch style, the 2D image;

determining, by the controller circuit, weights of a plurality of kernels corresponding to a plurality of deconvolutional layers by training a method for converting the first sketch image to the 2D image through training;

generating, by the controller circuit, a second sketch image by converting, based on the sketch style, the rendered image; and generating, by the controller circuit and based on the second sketch image and the weights of the plurality of kernels, the synthetic image.

13. The training dataset generating method of claim 12, wherein the determining of the weights of the plurality of kernels comprises:

generating, based on the first sketch image, a generator image;

determining similarity between the generator image and the 2D image;

determining whether the similarity is greater than or equal to a threshold; and determining, based on a determined result associated with the similarity, the weights of the plurality of kernels.

14. The training dataset generating method of claim 12, wherein the generating of the synthetic image further comprises generating, based on the second sketch image and based on the weights of the plurality of kernels determined through the training, a synthetic image included in the training dataset.

15. The training dataset generating method of claim 8, wherein the extracting of the labeling information for the target object comprises extracting classification labeling information for the target object from the 3D data.

16. The training dataset generating method of claim 8, wherein the 2D image comprises a color photo obtained by photographing a region comprising an assembly in which the target object is assembled with another object, the 3D data comprises assembly data indicating the assembly and single data indicating the target object, and the extracting of the labeling information for the target object comprises:

generating, by the controller circuit, target removal data by removing the target object from the assembly;

generating, by the controller circuit, black data by converting a color indicated by the target removal data to a black color;

generating, by the controller circuit, 3D object data by combining the black data with the single data; and generating, by the controller circuit, an object-rendered image by rendering the 3D object data.

17. The training dataset generating method of claim 16, wherein the extracting of the labeling information for the target object further comprises extracting, by the controller circuit and from the object-rendered image, shape labeling information corresponding to contour information for the target object.

18. The training dataset generating method of claim 17, wherein the extracting of the labeling information for the target object further comprises extracting, by the controller circuit, position labeling information corresponding to information indicating a horizontal upper limit of the contour information, a horizontal lower limit of the contour information, a vertical upper limit of the contour information, and a vertical lower limit of the contour information.

19. The training dataset generating method of claim 8, wherein the 2D image comprises a color photo obtained by photographing a region comprising the target object not assembled with another object, and the extracting of the labeling information for the target object comprises extracting, by the controller circuit, shape labeling information corresponding to contour information for the target object from the rendered image.

20. The training dataset generating method of claim 19, wherein the extracting of the labeling information for the target object further comprises extracting, by the controller circuit and from the contour information for the target object, the shape labeling information for the target object and position labeling information for the target object.

21. A non-transitory computer-readable medium storing instructions that cause:

generating, based on a two-dimensional (2D) image obtained by photographing a target object and based on three-dimensional (3D) data for the target object, a training dataset, wherein the generating comprises:

generating, by a controller circuit, a rendered image by rendering the 3D data;

generating, by the controller circuit, a synthetic image by synthesizing a content of the 2D image and a style of the rendered image together through a trained deep learning model;

extracting, by the controller circuit and from the 3D data or from the rendered image, labeling information for the target object; and generating, by the controller circuit and based on the synthetic image and the labeling information for the target object, the training dataset, wherein the generating of the synthetic image comprises:

extracting, via an encoder, a style feature from the 2D image and a content feature from the rendered image;

generating a synthetic feature by synthesizing the style feature and the content feature together; and

generating, via a decoder, the synthetic image, based on the synthetic feature, through the trained deep learning model, wherein the decoder comprises a plurality of deconvolutional layers for deconvolution of the synthetic feature, and determines weights of a plurality of kernels corresponding to the plurality of deconvolutional layers through the trained deep learning model, and wherein the decoder generates, based on the weights of the plurality of kernels and based on the synthetic feature, the synthetic image.

22. The non-transitory computer-readable medium of claim 21, wherein the generating of the synthetic image comprises:

generating a first sketch image by converting, based on a sketch style, the 2D image;

determining weights of a plurality of kernels corresponding to a plurality of deconvolutional layers by training a method for converting the first sketch image to the 2D image through training;

generating a second sketch image by converting, based on the sketch style, the rendered image; and generating, based on the second sketch image and the weights of the plurality of kernels, the synthetic image.

23. The non-transitory computer-readable medium of claim 22, wherein the determining of the weights of the plurality of kernels comprises:

generating, based on the first sketch image, a generator image;

determining similarity between the generator image and the 2D image;

determining whether the similarity is greater than or equal to a threshold; and determining, based on a determined result associated with the similarity, the weights of the plurality of kernels.

24. The non-transitory computer-readable medium of claim 21, wherein the 2D image comprises a color photo obtained by photographing a region comprising an assembly in which the target object is assembled with another object, the 3D data comprises assembly data indicating the assembly and single data indicating the target object, and the extracting of the labeling information for the target object comprises:

generating target removal data by removing the target object from the assembly;

generating black data by converting a color indicated by the target removal data to a black color;

generating 3D object data by combining the black data with the single data; and generating an object-rendered image by rendering the 3D object data.

* * * * *